(12) United States Patent
Kao

(10) Patent No.: US 6,682,229 B2
(45) Date of Patent: Jan. 27, 2004

(54) OPTICAL FIBER ARRAY

(75) Inventor: Tien-Lu Kao, La Mirada, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/090,407

(22) Filed: Mar. 1, 2002

(65) Prior Publication Data

US 2003/0165299 A1 Sep. 4, 2003

(51) Int. Cl.[7] .................................................. G02B 6/36
(52) U.S. Cl. ........................................................ 385/78
(58) Field of Search ................................ 439/248, 700, 439/824; 385/76–78, 53, 55, 58, 60

(56) References Cited

U.S. PATENT DOCUMENTS 3,848,949 A * 11/1974 Falkner
5,461,326 A * 10/1995 Woith et al. ................ 324/758
6,398,423 B1 * 6/2002 Novacoski et al. ........... 385/78

* cited by examiner

Primary Examiner—Khiem Nguyen
(74) Attorney, Agent, or Firm—Wei Te Chung

(57) ABSTRACT

A fiber array (1) includes a housing (10), threaded posts (45), ferrules (30), optical fibers (36), rings (38), springs (42), a press block (40), a holder plate (50), and a guide plate (60). Threaded through holes (46) are defined in the press block. The posts are movably received in the threaded through holes. The holder plate is secured to the press block. Retaining through holes (52) are defined in the holder plate, slidably retaining the ferrules. An annular groove (32) is defined in each ferrule. A ring (38) is received in the groove. The guide plate is secured to the holder plate. Guiding through holes (62) are defined in the guide plate, receiving front portions of the ferrules. The springs (42) are compressed between the rings and the holder plate. A position of each fiber is precisely adjustable to accurately receive light transmitting from a corresponding lens of a lens array.

16 Claims, 6 Drawing Sheets

OPTICAL FIBER ARRAY

BACKGROUND OF THE INVENTION

1. Field of the Invention

The present invention relates to integrated fiber array and lens array assemblies used in optoelectronic light gathering systems, and particularly to such assemblies which require accurate matching between the fiber array and the lens array due to varying effective focal lengths of lenses of the lens array.

2. Description of Prior Art

Nowadays speed, bandwidth and scalability of optical interconnections are becoming more and more important in communications networks. Due to the increasing density of optical fibers, ultra high precision of two-dimensional multi-fiber array systems must be achieved. For instance, overall positional tolerances in optical switch light gathering systems should be maintained within ±2 $\mu$m. This is particularly important when light beams are gathered by a fiber array from a lens array in an optical switch.

U.S. Pat. No. 5,241,612 discloses a multi-core optical connector comprising a first connector part and a second connector part. The first connector part has a fiber array, a refractive index matching plate for preventing diffusion of beams, and a lens array. The second connector part has a fiber array and a lens array. A diameter of each of parallel beams that may be emitted outwardly from the lens array of the second connector part is larger than a diameter of parallel beams that may be emitted outwardly from the lens array of the first connector part. The first connector part and the second connector part are optically coupled such that both lens arrays are opposed to each other. The multi-core optical connector provides good alignment between the two fiber arrays, and minimizes axial deviation and angular deviation that may occur between the two fiber arrays. However, the multi-core optical connector does not provide accurate optical alignment between the fiber array and the lens array, as explained below.

An optical entry point of each fiber of a fiber array should be accurately positioned to correspond to a focal point of the corresponding lens of the lens array. Each lens of a typical lens array has a different focal length, due to unavoidable manufacturing tolerances. However, the optical entry points of all fibers in a typical fiber array are substantially coplanar. Therefore, it is virtually impossible to accurately coincide the optical entry points of the fiber array with the focal points of the lens array. Referring to FIG. 1, a conventional optical assembly 2 includes a fiber array 3 and a lens array 4. The fiber array 3 has a plurality of optical fibers 5 arrayed in a holder 6. The lens array 4 is made from a block of silica material. An array of lenses 7 is formed on one side of the silica block, by etching and machining. When the lens array 4 is thus formed, variance in focal lengths among each of the lenses 7 unavoidably exists. Therefore, positions of the focal points of the lenses 7 are not coplanar. Thus the lens array 4 as formed cannot accurately transmit light to the fibers 5 of the fiber array 3. Similarly, the fibers 5 of the fiber array 3 cannot efficiently transmit light to the lens array 4.

SUMMARY OF THE INVENTION

In view of the above, an object of the present invention is to provide an optical fiber array in which each fiber can accurately receive transmitting light from each lens of a lens array.

In order to achieve the above object, an optical fiber array in accordance with the present invention comprises a housing, a plurality of threaded posts, a plurality of ferrules, a plurality of optical fibers, a plurality of rings, a plurality of springs, a press block, a holder plate, and a guide plate. A plurality of threaded through holes is defined in the press block. The posts are movably received in the threaded through holes. A channel is defined in each post, and retains a fiber therein. The holder plate is secured to the press block. A plurality of retaining through holes is defined in the holder plate. The ferrules are slidably retained in the retaining through holes. An annular groove is defined in each ferrule. A corresponding ring is engagingly received in the groove of the ferrule. Each post abuts an end of the corresponding ferrule. The guide plate is secured to the holder plate. A plurality of guiding through holes is defined in the guide plate, and receives front portions of the ferrules. The springs surround the ferrules, and are compressed between the rings of the ferrules and the holder plate. A position of each fiber is precisely adjustable so that it can accurately receive light transmitted from a corresponding lens of a lens array.

Other objects, advantages and novel features of the invention will become more apparent from the following detailed description when taken in conjunction with the accompanying drawings, in which:

DETAILED DESCRIPTION OF PREFERRED EMBODIMENT OF THE PRESENT INVENTION

Reference will now be made to the drawings to describe the present invention in detail.

Figure 1:
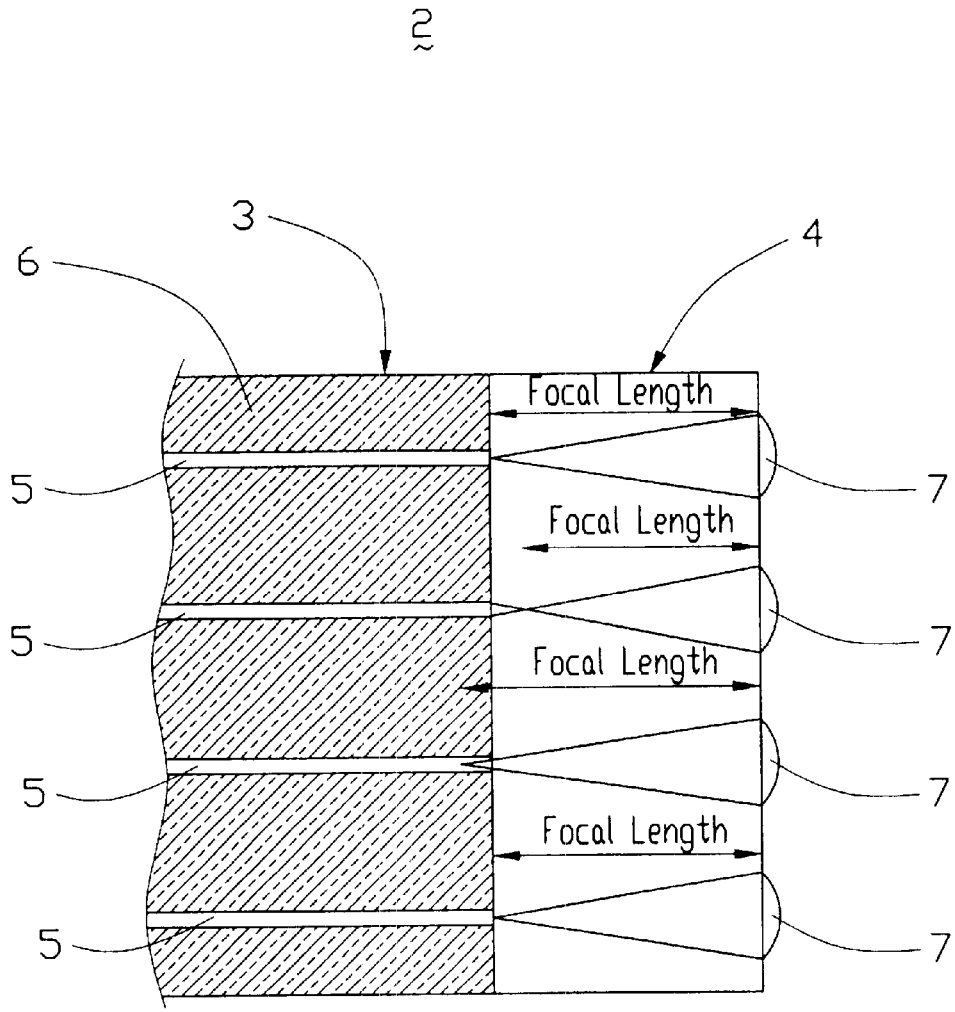
FIG. 1 is a schematic view of a conventional lens array block mounted to a conventional fiber array, showing variation in focal lengths of lenses of the lens array block.
Figure 2:
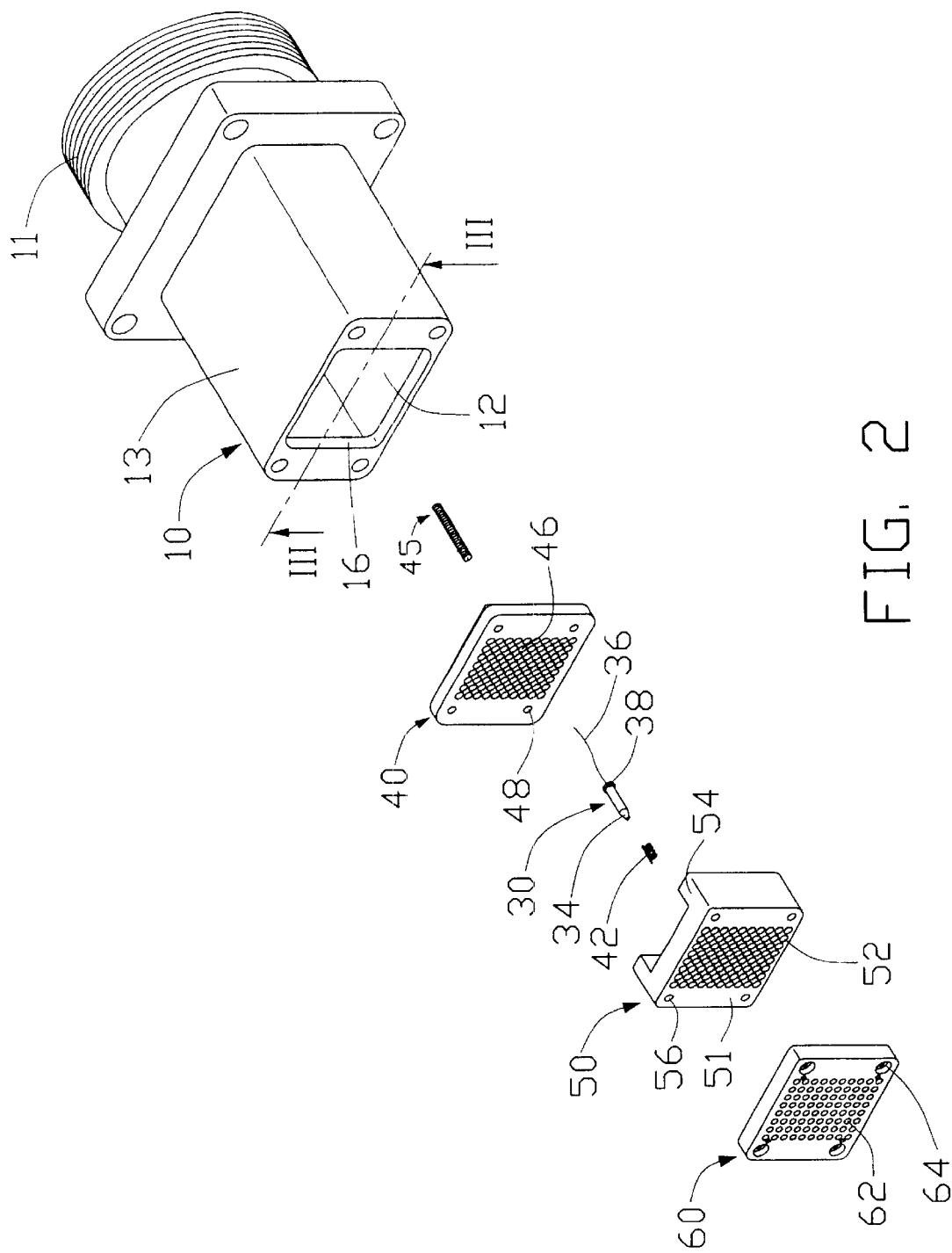
FIG. 2 is an exploded perspective view of an optical fiber array of the present invention.
Figure 5:
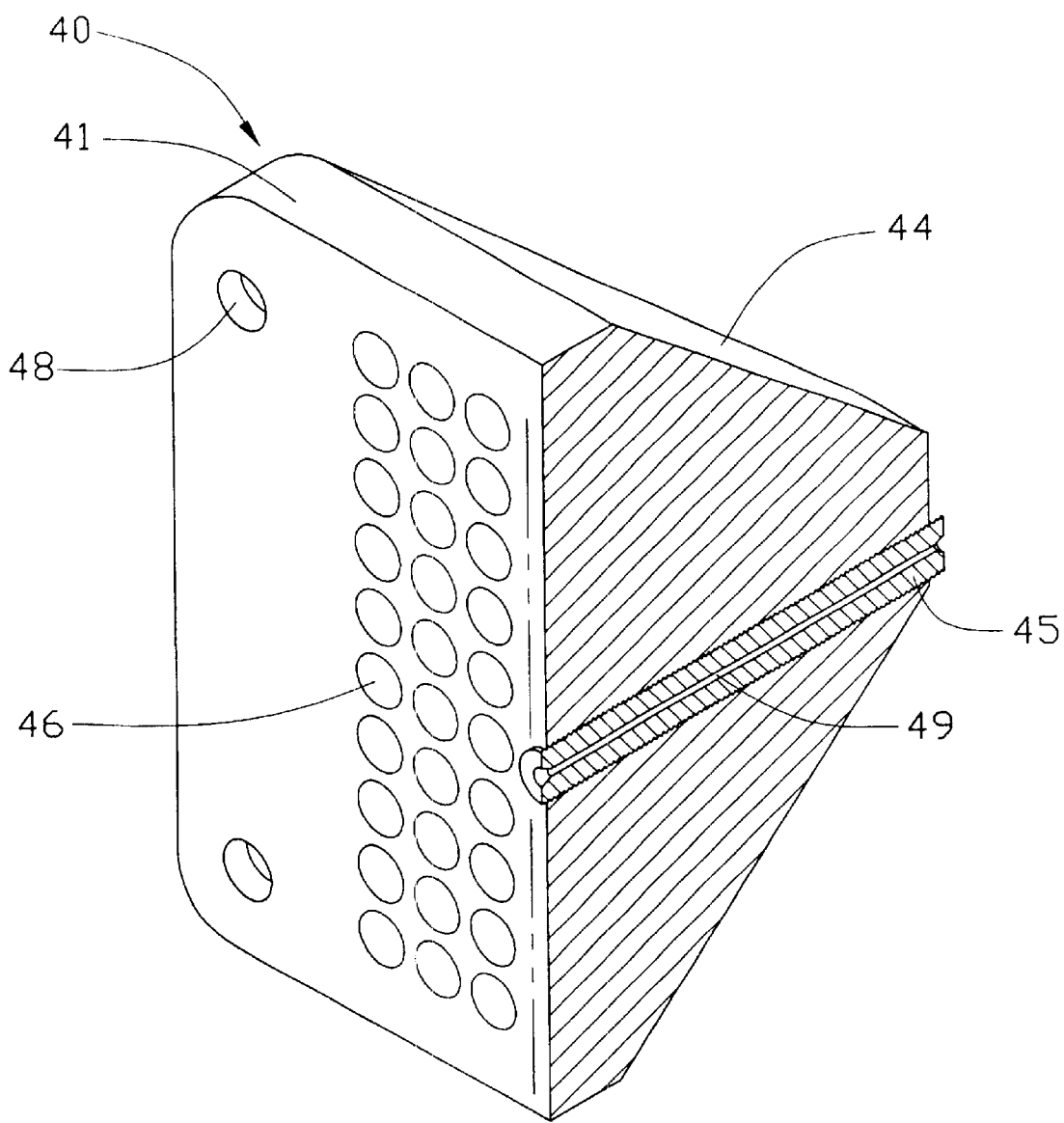
FIG. 5 is a cut-away perspective view of a press block and a threaded post of the fiber array of FIG. 2.
Figure 6:
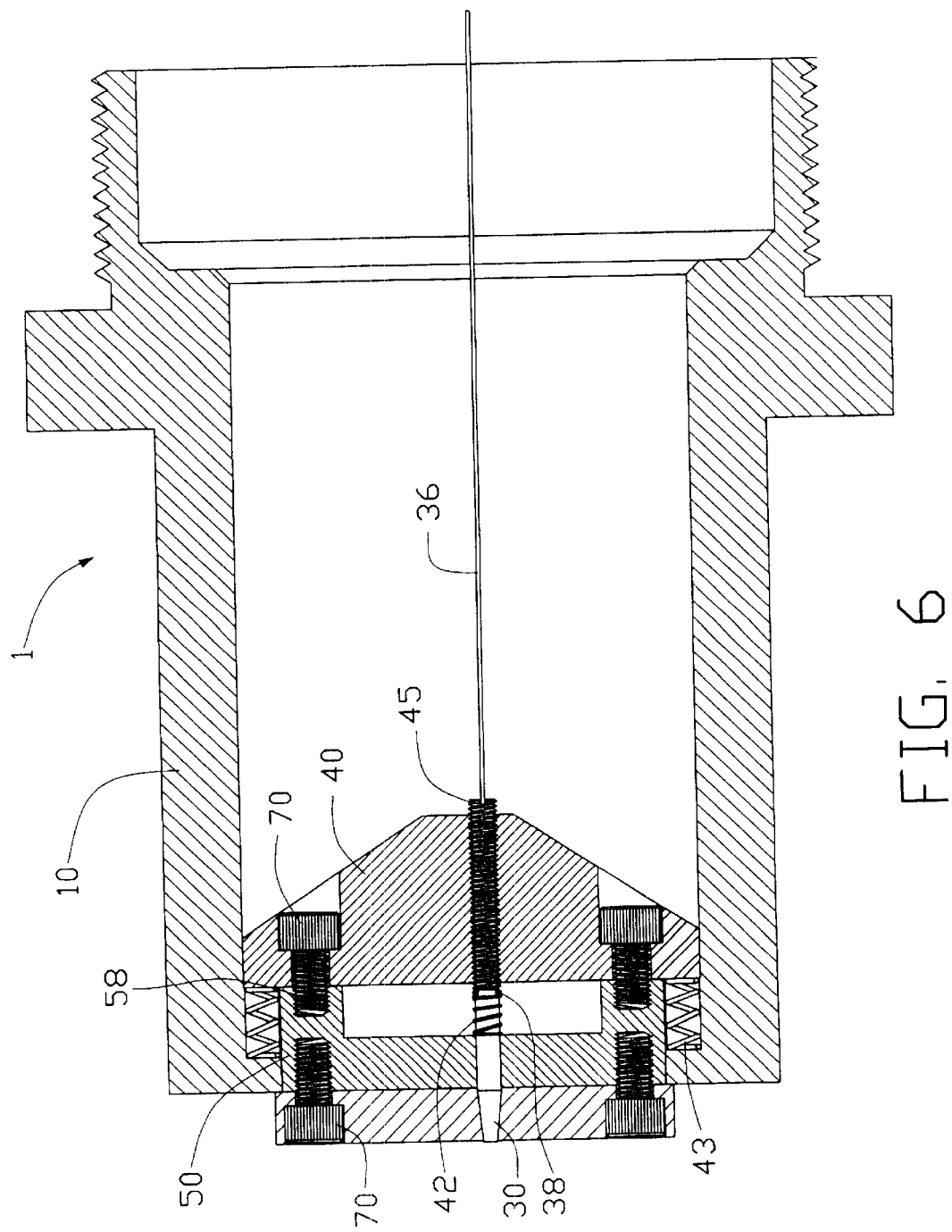
FIG. 6 is a cross-sectional view of the fiber array of FIG. 2 fully assembled.

Referring to FIGS. 2, 5 and 6, an optical fiber array 1 in accordance with a preferred embodiment of the present invention comprises a housing 10, a plurality of threaded posts 45 (only one shown), a plurality of ferrules 30 (only one shown), a plurality of optical fibers 36 (only one shown), a plurality of rings 38 (only one shown), a plurality of first springs 42 (only one shown), a press block 40, a holder plate 50 and a guide plate 60. The fiber array 1 is for coupling with a lens array (not shown).

Figure 3:
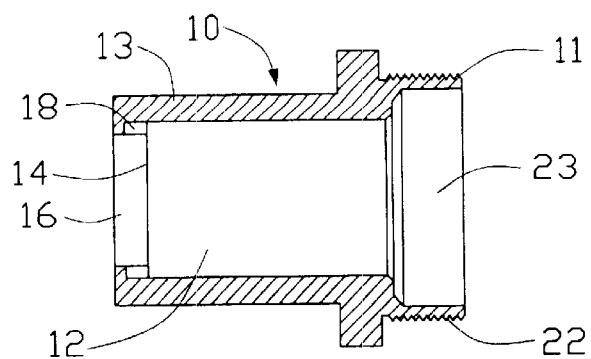
FIG. 3 is a cross-sectional view of a housing of the fiber array of FIG. 2.

Referring to FIG. 3, the housing 10 is generally made of stainless steel or plastic. The housing 10 comprises a cylindrical portion 11 and a first rectangular portion 13. A circular opening 23 is defined in the cylindrical portion 11. An external thread 22 is formed on an external surface of the cylindrical portion 11. A rectangular chamber 12 and a rectangular opening 16 are defined in the first rectangular portion 13, for receiving the press block 40 and the holder plate 50 therein. The rectangular chamber 12 is in communication with both the rectangular opening 16 and the circular opening 23. A step 14 is formed on an inner part of the first rectangular portion 13, where the rectangular chamber 12 adjoins the rectangular opening 16. Four evenly-spaced blind bores 18 are defined in the step 14, corresponding to four second springs 43 (see FIG. 6).

Figure 4:
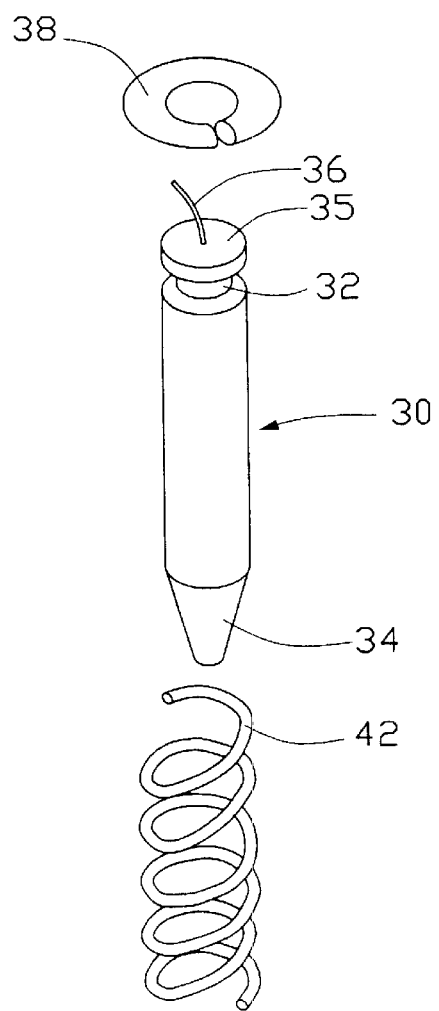
FIG. 4 is an enlarged perspective view of a ring, a ferrule retaining an optical fiber, and a spring, all of the fiber array of FIG. 2.

Referring to FIG. 4, each ferrule 30 is generally cylindrical. Each ferrule 30 comprises a tapered first end 34 and an opposite second end 35. A longitudinal retaining hole (not shown) is defined in each ferrule 30, for extension of a corresponding optical fiber 36 thereinto. One end of the fiber 36 terminates flush with the first end 34. A portion of the fiber 36 opposite to the first end 34 extends out from the second end 35. A n annular groove 32 is defined in the ferrule 30 near the second end 35. A ring 38 is engagingly received in the annular groove 32, with an outer diameter of the ring 38 being greater than a diameter of the ferrule 30.

Referring to FIGS. 2 and 5, the press block 40 is generally made of metallic material. The press block 40 comprises a second rectangular portion 41 and a pyramidal portion 44. An array of parallel threaded through holes 46 is defined through the combined second rectangular portion 41 and pyramidal portion 44. Four first stepped through apertures 48 are respectively defined in four corners of the press block 40. Each post 45 is movably engaged in each threaded through hole 46, with one end of the post 45 protruding out from the second rectangular portion 41 to abut against the second end 35 of the corresponding ferrule 30. A passage 49 is defined along a central longitudinal axis of the post 45, for extension of a corresponding fiber 36 therethrough.

Referring to FIG. 2, the holder plate 50 comprises a rectangular block 51, and a pair of standoffs 54 respectively extending perpendicularly from two opposite sides of the rectangular block 51. An array of parallel retaining through holes 52 is defined in the rectangular block 51, corresponding to the threaded through holes 46 of the press block 40. A diameter of each retaining through hole 52 is substantially equal to the diameter of each ferrule 30, for accurately retaining the ferrules 30 in position. Two spaced first threaded blind apertures 58 (see FIG. 6) are defined in each standoff 54, corresponding to the first stepped through apertures 48 of the press block 40. Four second threaded blind apertures 56 are respectively defined in four corners of the rectangular block 51.

The guide plate 60 is generally rectangular. An array of parallel guiding through holes 62 is defined in the guide plate 60, corresponding to the retaining through holes 52 of the holder plate 50. Each guiding through hole 62 is tapered so as to correspond to a shape of the first end 34 of the corresponding ferrule 30. Four second stepped through apertures 64 are respectively defined in four corners of the guide plate 60, corresponding to the second threaded blind apertures 56 of the holder plate 50.

Referring to FIG. 6, in pre-assembly, a portion (not visible) of each fiber 36 is retained in the corresponding ferrule 30. A remaining portion of the fiber 36 is retained in the passage 49 of the corresponding post 45 with epoxy. One end of the post 45 protrudes out from the second rectangular portion 41 of the press block 40. A corresponding first spring 42 is placed over the ferrule 30 to surround the ferrule 30. The ferrule 30 is slidably retained in a corresponding retaining through hole 52 of the holder plate 50. The standoffs 54 of the holder plate 50 are attached to a main face of the second rectangular portion 41. The post 45 abuts against the second end 35 of the ferrule 30. The holder plate 50 is then fixed to the press block 40. Four fixing screws 70 are respectively extended through the first stepped through apertures 48 of the press block 40 and engaged in the first threaded blind apertures 58 of the holder plate 50. As a result, the first spring 42 is compressed between the ring 38 and an inner surface of the rectangular block 51 of the holder plate 50.

Figure 7:
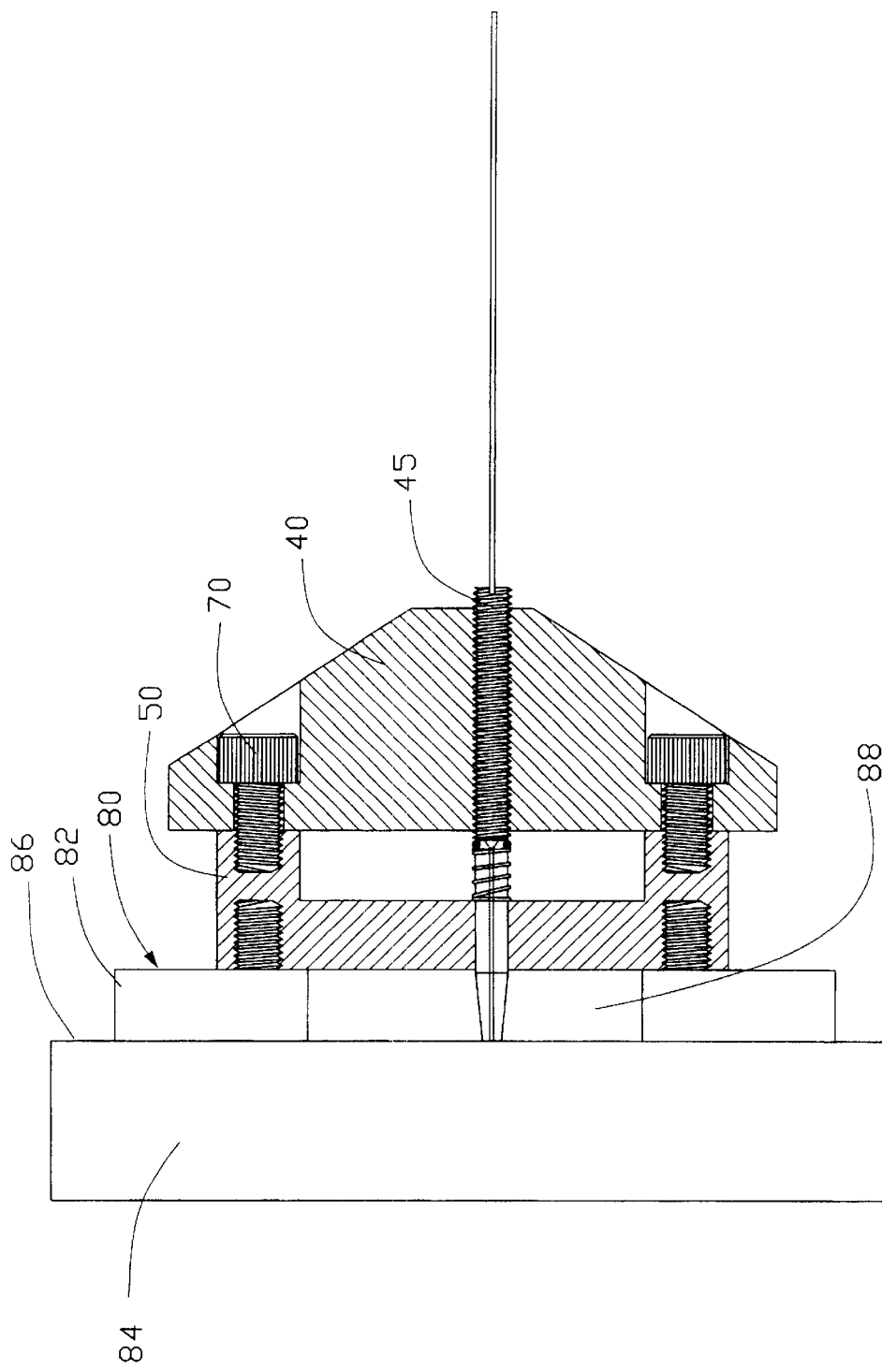
FIG. 7 is a schematic cross-sectional view of the press block and a holder plate of the fiber array of FIG. 2 combined together and fastened to a gauge block, showing adjustment of a position of a ferrule of the fiber array of FIG. 2 retained in the holder plate.

Referring to FIG. 7, a gauge block 80 is provided to assure coplanarity of the ferrules 30 retained in the holder plate 50. The gauge block 80 comprises a base 84 having a mirror surface 86, and a spacer 82. The spacer 82 and the mirror surface 86 cooperatively define a space 88 therebetween.

In assembly, the combined press block 40 and holder plate 50 is tightly fastened to the gauge block 80 with four screws (not labeled). Each post 45 is adjusted so that the first end 34 of the corresponding ferrule 30 is flush with the mirror surface 86. Referring to FIG. 6, a portion of each second spring 43 is inserted into the corresponding blind bore 18 of the housing 10. The combined press block 40 and holder plate 50 is then placed in the rectangular opening 16 and the rectangular chamber 12 of the housing 10. The main face of the second rectangular portion 41 of the press block 40 abuts against ends of the second springs 43. The guide plate 60 is then placed over the rectangular opening 16, and fixed to the holder plate 50. Four more fixing screws 70 are extended through the second stepped through apertures 64 of the guide plate 60 and engaged in the second threaded blind apertures 56 of the holder plate 50. The second springs 43 are thus compressed between the step 14 of the housing 10 and the main face of the second rectangular portion 41 of the press block 40. The combined holder plate 50 and press block 40 is thus retained in the housing 10. The lens array is then coupled with the guide plate 60 of the fiber array 1. Each post 45 is rotated to accurately adjust a position of the corresponding ferrule 30. Accordingly, a focal length of the corresponding lens of the lens array precisely corresponds to a position of the end of the fiber 36 at the first end 34 of the ferrule 30.

In the present invention, a position of each fiber 36 of the fiber array 1 can be accurately adjusted according to the focal length of the corresponding lens of the lens array. Consequently, light beams transmitted in the fiber array 1 can be efficiently coupled into the lens array. Similarly, light beams transmitted in the lens array can be efficiently coupled into the fiber array 1.

While the preferred embodiment in accordance with the present invention has been shown and described, equivalent modifications and changes known to persons skilled in the art according to the spirit of the present invention are considered to be within the scope of the present invention as defined in the appended claims.

What is claimed is:

1. A fiber array from which light beams are precisely gathered to a lens array in an optical switch, the fiber array comprising:

a holder defining an array of first holes;

a plurality of optical fibers;

a plurality of ferrules each retaining a corresponding fiber therein;

a plurality of posts abutting against the plurality of ferrules: and a plurality of springs surrounding the ferrules:

wherein a diameter of each of the first holes is substantially equal to a diameter of each of the ferrules, and each of the posts is threadedly adjusted to retain an end of the ferrule in a position where a corresponding focal point of each lens of said lens array is positioned.

2. The fiber array as described in claim 1, further comprising a block and a guide member attached to the holder, the block defining an array of second holes corresponding to the array of first holes, the guide member defining an array of third holes corresponding to the array of first holes.

3. The fiber array as described in claim 2, wherein each of the posts is threadedly engaged in a corresponding second bole and is movable along the second hole, and each of the ferrules is slidable by means of moving a corresponding post.

4. A fiber array comprising:

a holder defining an array of first holes;

a plurality of optical fibers;

a plurality of ferrules retaining corresponding optical fibers therein;

a plurality of springs exerting resilient force on the ferrules;

a plurality of posts abutting corresponding ferrules;

a block attached to the holder, the block defining an array of second holes; and a guide member attached to the holder, the guide member defining an array of third holes;

wherein
a diameter of each of the first holes is substantially equal to a diameter of each of the ferrules, and the ferrules are slidably retained in the first holes.

5. The fiber array as described in claim 4, wherein the block is attached to the holder from one side thereof, and the guide member is attached to the holder from the other opposite side thereof, the array of first holes being corresponding to both the array of the second holes and the array of the third holes.

6. The fiber array as described in claim 5, wherein each of the posts is threadedly engaged in a corresponding second hole and being movable along the second hole, each of the ferrules being slidable by means of moving a corresponding post.

7. A fiber array from which light beams are precisely gathered to a lens array in an optical switch, the fiber array comprising:

an optical fiber array subassembly comprising a holder defining an array of first holes;

a plurality of optical fibers;

a plurality of ferrules each retaining a corresponding fiber therein, the ferrules being retained in the array of first holes;

a plurality of posts; and a guide member for receiving an end of the ferrules therein, the guide member being attached to the holder;

wherein
a diameter of each of the first holes is substantially equal to a diameter of each of the ferrules, and each of the posts urges a corresponding ferrule in a position where a focal point of a corresponding lens of the lens array is positioned.

8. The fiber array as described in claim 7, wherein the fiber array subassembly further comprises a block attached to the holder, the block defining an array of second holes corresponding to the array of first holes.

9. The fiber array as described in claim 8, wherein each of the posts is threadedly engaged in a corresponding second hole and is movable along the second hole.

10. The fiber array as described in claim 9, wherein each of the ferrules is slidable by means of moving a corresponding post.

11. The fiber array as described in claim 7, wherein the guide member defines an array of third holes corresponding to the array of first holes.

12. The fiber array as described in claim 11, wherein each of the third holes is dimensioned to correspond to a shape of an end portion of a corresponding ferrule.

13. An optical fiber array from which light beams are precisely gathered to a lens array in an optical switch, the fiber array comprising:

a holder defining an array of holes;

a plurality of ferrules located in the corresponding holes, respectively;

a plurality of optic fibers connected to rear ends of the corresponding ferrules, respectively;

a plurality of discrete springs urging the corresponding ferrules to move rearwardly, respectively;

a plurality of posts engaging the rear ends of the corresponding ferrules, respectively, and a guide member for receiving an end of each optic fiber; wherein
each of said posts is axially adjustably moveable to decide an axial position of the corresponding ferrule in the holder, thereby, a focal length of the corresponding lens of the lens array precisely corresponds to a position of the end of the optic fiber.

14. The array as described in claim 13, wherein said posts are threaded back and forth in a press block to adjustably move axially.

15. The array as described in claim 14, further comprising a housing having a space receiving the holder, the press block, and springs therein.

16. The array as described in claim 13, wherein said guide member is attached to the holder, and defines an array of third holes corresponding to the array of first holes of the holder.

* * * * *